US010880297B2

(12) United States Patent
He et al.

(10) Patent No.: US 10,880,297 B2
(45) Date of Patent: Dec. 29, 2020

(54) FORWARDING METHOD, FORWARDING APPARATUS, AND FORWARDER FOR AUTHENTICATION INFORMATION IN INTERNET OF THINGS

(71) Applicant: HUAWEI TECHNOLOGIES CO., LTD., Guangdong (CN)

(72) Inventors: Danping He, Shenzhen (CN); Dacheng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 15/639,248

(22) Filed: Jun. 30, 2017

(65) Prior Publication Data

US 2017/0302660 A1  Oct. 19, 2017

Related U.S. Application Data

(63) Continuation of application No. PCT/CN2015/096300, filed on Dec. 3, 2015.

(30) Foreign Application Priority Data

Jan. 4, 2015 (CN) .......................... 2015 1 0003726

(51) Int. Cl.
*H04L 29/06* (2006.01)
*H04W 12/06* (2009.01)
*H04W 12/12* (2009.01)

(52) U.S. Cl.
CPC .......... *H04L 63/0853* (2013.01); *H04L 29/06* (2013.01); *H04L 63/083* (2013.01);
(Continued)

(58) Field of Classification Search
CPC ............. H04L 63/0853; H04L 63/1441; H04L 63/083; H04L 63/0807; H04L 63/126;
(Continued)

(56) References Cited

U.S. PATENT DOCUMENTS 5,598,459 A   1/1997 Haartsen
2006/0059346 A1   3/2006 Sherman et al.
(Continued)

FOREIGN PATENT DOCUMENTS

CN   1193449 A   9/1998
CN   101110762 A   1/2008
(Continued)

OTHER PUBLICATIONS

Shibutani, Akira, Development of Portable SIM for creating a new service, NTT DOCOMO Technical Journal, The Telecommunications Association, Jan. 1, 2015, vol. 22, No. 4 (10 pp.), Translation of Abstract only.
(Continued)

*Primary Examiner* — Cheng-Feng Huang
(74) *Attorney, Agent, or Firm* — Conley Rose, P.C.

(57) ABSTRACT

Embodiments of the present application disclose a forwarding method, a forwarding apparatus, and a forwarder for authentication information in the Internet of Things. The method is applied to a constrained node and includes: receiving authentication information; determining whether the authentication information is received for the first time; and if the authentication information is received not for the first time, forwarding the authentication information; or if the authentication information is received for the first time, determining whether the authentication information is valid authentication information, and if the authentication information is not valid authentication information, discarding the authentication information, or if the authentication information is valid authentication information, verifying the valid authentication information, and forwarding the valid authentication information after the verification succeeds. The embodiments of the present application can reduce
(Continued)

resources of the constrained node, and improve performance of the Internet of Things.

14 Claims, 4 Drawing Sheets

(52) U.S. Cl.
CPC ...... *H04L 63/0807* (2013.01); *H04L 63/0884* (2013.01); *H04L 63/126* (2013.01); *H04L 63/1441* (2013.01); *H04W 12/06* (2013.01); *H04W 12/1205* (2019.01); *H04L 63/108* (2013.01); *H04L 2463/121* (2013.01); *H04L 2463/142* (2013.01)

(58) Field of Classification Search
CPC ................ H04L 63/0884; H04L 29/06; H04L 2463/142; H04L 2463/121; H04L 63/108; H04L 63/08; H04L 63/0823; H04W 12/06; H04W 12/1205
See application file for complete search history.

(56) References Cited

U.S. PATENT DOCUMENTS

| | | | |
|---|---|---|---|
| 2006/0137005 A1 | 6/2006 | Park | |
| 2009/0094688 A1* | 4/2009 | Roy | G06F 21/335 726/7 |
| 2010/0299212 A1* | 11/2010 | Graylin | G06Q 30/0601 705/14.66 |
| 2012/0137363 A1 | 5/2012 | Meliksetian et al. | |
| 2012/0297474 A1* | 11/2012 | Zhang | H04W 76/15 726/10 |
| 2013/0244614 A1* | 9/2013 | Santamaria | H04L 51/04 455/411 |
| 2013/0288668 A1* | 10/2013 | Pragada | H04L 67/16 455/426.1 |
| 2015/0026768 A1* | 1/2015 | Wu | H04W 12/0013 726/3 |
| 2015/0047001 A1 | 2/2015 | Izumi et al. | |
| 2015/0139211 A1* | 5/2015 | Ji | H04W 48/16 370/338 |
| 2015/0326398 A1* | 11/2015 | Modarresi | H04L 63/08 713/181 |
| 2015/0349960 A1* | 12/2015 | Bagley | H04L 9/3242 713/168 |
| 2016/0119284 A1* | 4/2016 | Kim | H04W 76/10 726/12 |
| 2017/0093868 A1* | 3/2017 | Slavov | H04W 4/70 |
| 2017/0244567 A1* | 8/2017 | Smeets | H04L 9/3247 |

FOREIGN PATENT DOCUMENTS

| | | |
|---|---|---|
| CN | 101252438 A | 8/2008 |
| CN | 101378315 A | 3/2009 |
| CN | 101902462 A | 12/2010 |
| CN | 101997681 A | 3/2011 |
| CN | 102480490 A | 5/2012 |
| CN | 103580863 A | 2/2014 |
| CN | 103684790 A | 3/2014 |
| CN | 103905203 A | 7/2014 |
| CN | 104580207 A | 4/2015 |
| EP | 3174269 A1 | 5/2017 |
| JP | 2004172865 A | 6/2004 |
| JP | 2005301876 A | 10/2005 |
| JP | 2006178976 A | 7/2006 |
| JP | 2007149010 A | 6/2007 |
| JP | 2007293719 A | 11/2007 |
| JP | 2011100411 A | 5/2011 |
| JP | 2011221706 A | 11/2011 |
| JP | 2012242990 A | 12/2012 |
| JP | 2014511579 A | 5/2014 |
| JP | 2014164751 A | 9/2014 |
| JP | WO2013168461 A1 | 1/2016 |
| WO | 2013/175901 A1 | 11/2013 |

OTHER PUBLICATIONS

Notice of Reasons for Rejection, dated May 29, 2018, in Japanese Application No. 2017535650 (5 pp.).
International Search Report, dated Mar. 1, 2016, in International Application No. PCT/CN2015/096300 (4 pp.).
Chinese Office Action dated Dec. 4, 2017 in corresponding Chinese Patent Application No. 201510003726.5.
International Search Report dated Mar. 1, 2016 in corresponding International Patent Application No. PCT/CN2015/096300.
Chinese Office Action dated May 3, 2017 in corresponding Chinese Patent Application No. 201510003726.5.
Borman, C., et al., "Terminology for Constrained-Node Networks," RFC 7228, May 2014, 17 pages.

* cited by examiner

FORWARDING METHOD, FORWARDING APPARATUS, AND FORWARDER FOR AUTHENTICATION INFORMATION IN INTERNET OF THINGS

CROSS-REFERENCE TO RELATED APPLICATIONS

This application is a continuation of International Application No. PCT/CN2015/096300, filed on Dec. 3, 2015, which claims priority to Chinese Patent Application No. 201510003726.5, filed on Jan. 4, 2015. The disclosures of the aforementioned applications are hereby incorporated by reference in their entireties.

TECHNICAL FIELD

The present application relates to the field of the Internet of Things, and in particular, to a forwarding method, a forwarding apparatus, and a forwarder for authentication information in the Internet of Things.

BACKGROUND

The Internet of Things brings great convenience to people's life. In the prior art, authorization and authentication methods used by the Internet of Things both use a push model (push model) as a basic framework. For example, when a client requests a resource from a resource server (RS) on the other side of the Internet of Things or performs a resource operation, the client first needs to send a resource obtaining request to the RS, and after the RS returns information about an authorization server (AS), the client requests authorization from the AS. After obtaining an authorization credential from the AS, the client requests authentication from the RS by using the Datagram Transport Layer Security (DTLS) protocol. After authentication by the RS on the client succeeds, the client may request the resource from the RS or perform the resource operation.

In an art, the client may be unable to communicate with the RS directly. In this case, authentication information sent by the client to the RS needs to be forwarded by another node. However, if the node that forwards an authentication request is a constrained node, because a constrained node has a limited quantity of resources, in particular, when bandwidth resources and power supply resources are limited, quality of communication between the client and the RS is affected directly.

In an art, all nodes, including constrained nodes, in the Internet of Things forward authentication information unconditionally without filtering the information. If in an actual situation, a client in the Internet of Things maliciously sends a large amount of authentication information to an RS on the other side of the Internet of Things, nodes located between the client and the RS need to forward a large quantity of malicious authentication messages unconditionally. If the nodes that forward the authentication information are constrained nodes, it may cause that a large quantity of bandwidth resources of these nodes are occupied, and that electric power is consumed quickly. As a result, overall performance of the Internet of Things is affected, and even the Internet of Things is paralyzed.

SUMMARY

Embodiments of the present application provide a forwarding method, a forwarding apparatus, and a forwarder for authentication information in the Internet of Things, so as to resolve a problem that in the Internet of Things, performance of the Internet of Things is affected because a constrained node forwards authentication information unconditionally.

To resolve the foregoing technical problem, the embodiments of the present application disclose the following technical solutions.

According to a first aspect, a forwarding method for authentication information in the Internet of Things is provided, where the method is applied to a constrained node and includes:

receiving authentication information;

determining whether the authentication information is received for the first time; and if the authentication information is received not for the first time, forwarding the authentication information; or if the authentication information is received for the first time, determining whether the authentication information is valid authentication information, and if the authentication information is not valid authentication information, discarding the authentication information, or if the authentication information is valid authentication information, verifying the valid authentication information, and forwarding the valid authentication information after the verification succeeds.

With reference to the first aspect, in a first possible implementation manner of the first aspect, the determining whether the authentication information is received for the first time includes:

if the authentication information is forwarded in a security mode, determining that the authentication information is received not for the first time; or if the authentication information is forwarded not in a security mode, determining that the authentication information is received for the first time.

With reference to the first aspect, in a second possible implementation manner of the first aspect, the determining whether the authentication information is valid authentication information includes:

if the authentication information includes a forward token, determining that the authentication information is valid authentication information; or if the authentication information does not include a forward token, determining that the authentication information is not valid authentication information.

With reference to the first aspect, in a third possible implementation manner of the first aspect, the verifying the valid authentication information includes:

obtaining, from the valid authentication information, a forward token delivered by an authorization server;

determining whether the forward token is a legitimate token; and if the forward token is a legitimate token, determining that the verification succeeds; or if the forward token is not a legitimate token, determining that the verification fails.

With reference to the third possible implementation manner of the first aspect, in a fourth possible implementation manner of the first aspect, the determining whether the forward token is a legitimate token includes:

obtaining time validity of the forward token according to the forward token;

determining whether the forward token is within a valid period;

if the forward token is within the valid period, determining whether a route between the node and the resource server exists; and if the route exists, determining that the forward token is a legitimate token.

With reference to the fourth possible implementation manner of the first aspect, in a fifth possible implementation manner of the first aspect, the forwarding the valid authentication information after the verification succeeds includes:

obtaining a forwarding node in each existing route, where the forwarding node is a node that receives the valid authentication information forwarded by the node; and obtaining an IP address of each forwarding node, and forwarding the valid authentication information according to the IP address of the forwarding node.

With reference to the fifth possible implementation manner of the first aspect, in a sixth possible implementation manner of the first aspect, the forwarding the valid authentication information according to the IP address of the forwarding node includes:

deleting the forward token in the valid authentication information; and forwarding, according to the IP address of the forwarding node and in a security mode, the valid authentication information with the forward token deleted.

According to a second aspect, a forwarding apparatus for authentication information in the Internet of Things is provided, where the apparatus includes:

a receiving unit, configured to receive authentication information;

a first determining unit, configured to determine whether the authentication information is received for the first time;

a forwarding unit, configured to: if the authentication information is received not for the first time, forward the authentication information; and a second determining unit, configured to: if the authentication information is received for the first time, determine whether the authentication information is valid authentication information, and if the authentication information is not valid authentication information, discard the authentication information, or if the authentication information is valid authentication information, verify the valid authentication information, and forward the valid authentication information after the verification succeeds.

With reference to the second aspect, in a first possible implementation manner of the second aspect, the first determining unit is configured to:

if the authentication information is forwarded in a security mode, determine that the authentication information is received not for the first time; or if the authentication information is forwarded not in a security mode, determine that the authentication information is received for the first time.

With reference to the second aspect, in a second possible implementation manner of the second aspect, the second determining unit is configured to:

if the authentication information includes a forward token, determine that the authentication information is valid authentication information; or if the authentication information does not include a forward token, determine that the authentication information is not valid authentication information.

With reference to the second aspect, in a third possible implementation manner of the second aspect, the second determining unit includes a verification subunit, and the verification subunit is configured to:

obtain, from the valid authentication information, a forward token delivered by an authorization server;

determine whether the forward token is a legitimate token; and if the forward token is a legitimate token, determine that the verification succeeds; or if the forward token is not a legitimate token, determine that the verification fails.

With reference to the third possible implementation manner of the second aspect, in a fourth possible implementation manner of the second aspect, the verification subunit is further configured to:

obtain time validity of the forward token according to the forward token;

determine whether the forward token is within a valid period;

if the forward token is within the valid period, determine whether a route between the node and the resource server exists; and if the route exists, determine that the forward token is a legitimate token.

With reference to the fourth possible implementation manner of the second aspect, in a fifth possible implementation manner of the second aspect, the forwarding the valid authentication information after the verification succeeds includes:

the second determining unit further includes a valid authentication information forwarding subunit, and the valid authentication information forwarding subunit is configured to:

obtain a forwarding node in each existing route, where the forwarding node is a node that receives the valid authentication information forwarded by the node; and obtain an IP address of each forwarding node, and forward the valid authentication information according to the IP address of the forwarding node.

With reference to the fifth possible implementation manner of the second aspect, in a sixth possible implementation manner of the second aspect, the valid authentication information forwarding subunit is further configured to:

delete the forward token in the valid authentication information; and forward, according to the IP address of the forwarding node and in a security mode, the valid authentication information with the forward token deleted.

According to a third aspect, a forwarder for authentication information in the Internet of Things, where the forwarder includes:

a receiver, configured to receive authentication information; and a processor, configured to determine whether the authentication information is received for the first time, where the processor is further configured to: if the authentication information is received not for the first time, forward the authentication information; and the processor is further configured to: if the authentication information is received for the first time, determine whether the authentication information is valid authentication information, and if the authentication information is not valid authentication information, discard the authentication information, or if the authentication information is valid authentication information, verify the valid authentication information, and forward the valid authentication information after the verification succeeds.

With reference to the third aspect, in a first possible implementation manner of the third aspect, the processor is configured to:

if the authentication information is forwarded in a security mode, determine that the authentication information is received not for the first time; or if the authentication information is forwarded not in a security mode, determine that the authentication information is received for the first time.

With reference to the third aspect, in a second possible implementation manner of the third aspect, the processor is configured to:

if the authentication information includes a forward token, determine that the authentication information is valid authentication information; or if the authentication information does not include a forward token, determine that the authentication information is not valid authentication information.

With reference to the third aspect, in a third possible implementation manner of the third aspect, the processor is configured to:

obtain, from the valid authentication information, a forward token delivered by an authorization server;

determine whether the forward token is a legitimate token; and if the forward token is a legitimate token, determine that the verification succeeds; or if the forward token is not a legitimate token, determine that the verification fails.

With reference to the third possible implementation manner of the third aspect, in a fourth possible implementation manner of the third aspect, the processor is configured to:

obtain time validity of the forward token according to the forward token;

determine whether the forward token is within a valid period;

if the forward token is within the valid period, determine whether a route between the node and the resource server exists; and if the route exists, determine that the forward token is a legitimate token.

With reference to the fourth possible implementation manner of the third aspect, in a fifth possible implementation manner of the third aspect, the processor is configured to:

obtain a forwarding node in each existing route, where the forwarding node is a node that receives the valid authentication information forwarded by the node; and obtain an IP address of each forwarding node, and forward the valid authentication information according to the IP address of the forwarding node.

With reference to the fifth possible implementation manner of the third aspect, in a sixth possible implementation manner of the third aspect, the processor is further configured to:

delete the forward token in the valid authentication information; and forward, according to the IP address of the forwarding node and in a security mode, the valid authentication information with the forward token deleted.

The embodiments of the present application disclose a forwarding method for authentication information in the Internet of Things. In the method, after receiving authentication information for the first time, a constrained node verifies the authentication information, and forwards the authentication information after the verification succeeds. This prevents a large amount of malicious authentication information from occupying bandwidth and consuming electric power of the constrained node that forwards the authentication information. In another case, when the authentication information is received not for the first time, the constrained node directly forwards the authentication information, so as to avoid wasting of system resources and improve performance of the Internet of Things.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following embodiments of the present application provide a forwarding method, a forwarding apparatus, and a forwarder for authentication information in the Internet of Things, so as to improve performance of the Internet of Things.

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

In the embodiments of the present application, a constrained node refers to a node with limited capabilities in computing, storage, and power supply and limited bandwidth, especially a node with a limited power supply capability and limited bandwidth, for example, a mobile terminal such as a mobile phone that may act as a node in the Internet of Things. A "constrained node" in the embodiments of the present application may alternatively be a constrained node or a constrained device specified in RFC 7228 of the Internet Engineering Task Force (IETF).

Figure 1:
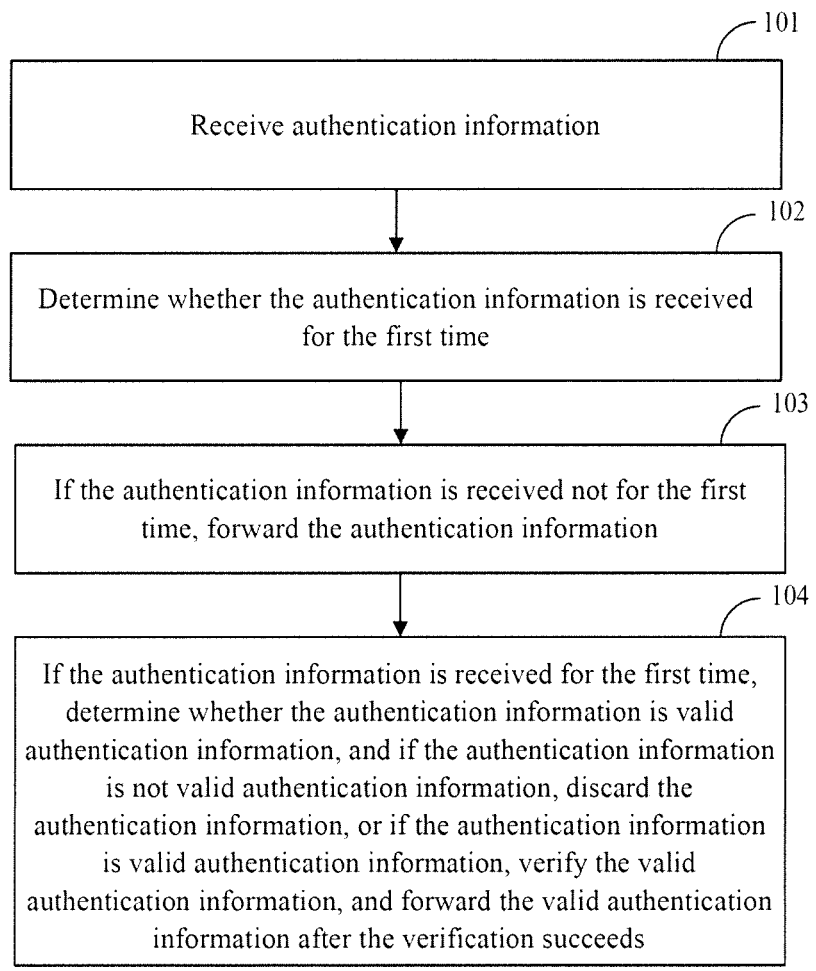
FIG. 1 shows a flowchart of a forwarding method for authentication information in the Internet of Things according to an embodiment of the present application.

As shown in FIG. 1, an embodiment of the present application provides a flowchart of a forwarding method for authentication information in the Internet of Things. As shown in FIG. 1, the method is applied to a constrained node.

The method includes the following steps.

S101: Receive authentication information.

S102: Determine whether the authentication information is received for the first time.

That the authentication information is received for the first time means that the node receives, for the first time, the current authentication information sent by a source client to a destination resource server.

In S102, the determining whether the authentication information is received for the first time includes:

if the authentication information is forwarded in a security mode, determining that the authentication information is received not for the first time; or if the authentication information is forwarded not in a security mode, determining that the authentication information is received for the first time.

S103: If the authentication information is received not for the first time, forward the authentication information.

The determining whether the authentication information is valid authentication information includes:

if the authentication information includes a forward token, determining that the authentication information is valid authentication information; or if the authentication information does not include a forward token, determining that the authentication information is not valid authentication information.

S104: If the authentication information is received for the first time, determine whether the authentication information is valid authentication information, and if the authentication information is not valid authentication information, discard the authentication information, or if the authentication information is valid authentication information, verify the valid authentication information, and forward the valid authentication information after the verification succeeds.

In S104, the determining whether the authentication information is valid authentication information includes:

if the authentication information includes a forward token, determining that the authentication information is valid authentication information; or if the authentication information does not include a forward token, determining that the authentication information is not valid authentication information.

The authentication information may be the first handshake message (Client Hello).

In this embodiment of the present application, authentication information that is received for the first time and is not valid may be considered to be malicious authentication information. Discarding the malicious authentication information may avoid wasting of resources of the constrained node.

In this embodiment of the present application, a client obtains authorization from an authorization server, and the authorization server delivers a forward token while delivering an authorization token. The forward token may carry information such as time validity of the forward token, an IP address of the client, an address of the resource server, and a signature of the authorization server.

In the forwarding method for authentication information in the Internet of Things according to this embodiment of the present application, after receiving authentication information for the first time, a constrained node first determines whether the authentication information is valid authentication information. If the authentication information is valid authentication information, the constrained node verifies the valid authentication information, and forwards the valid authentication information after the verification succeeds. This prevents a large amount of malicious authentication information from occupying bandwidth and consuming electric power of the constrained node that forwards the authentication information. In another case, when the authentication information is received not for the first time, the constrained node directly forwards the authentication information, so as to avoid wasting of system resources and improve performance of the Internet of Things.

Actually, the method in this embodiment of the present application may be applied to a constrained node. When a client sending authentication information comes from a different domain, the method in this embodiment may be applied to a proxy server as well. In this case, the proxy server may also be considered as a constrained node.

In S104, the verifying the valid authentication information includes:

obtaining, from the authentication information, a forward token delivered by an authorization server;

determining whether the forward token is a legitimate token; and if the forward token is a legitimate token, determining that the verification succeeds; or if the forward token is not a legitimate token, determining that the verification fails.

The forward token carried in the authentication information may replace a data field in the first handshake message with a forward token.

The determining whether the forward token is a legitimate token includes:

obtaining time validity of the forward token according to the forward token;

determining whether the forward token is within a valid period;

if the forward token is within the valid period, determining whether a route between the node and the resource server exists; and if the route exists, determining that the forward token is a legitimate token.

The forwarding the authentication information after the verification succeeds includes:

obtaining a forwarding node in each existing route, where the forwarding node is a node that receives the valid authentication information forwarded by the node; and obtaining an Internet Protocol IP address of each forwarding node, and forwarding the authentication information according to the IP address of the forwarding node.

There may be multiple routes between the client and the resource server. Forwarding the valid authentication information in all routes can avoid a failure in delivering the valid authentication information to the resource server in time in the case of a single route due to a line failure, line interference, a relatively long delay, or the like.

The forwarding the authentication information according to the IP address of the forwarding node includes:

deleting the forward token in the valid authentication information; and forwarding, according to the IP address of the forwarding node and in a security mode, the valid authentication information with the forward token deleted.

The forward token in the valid authentication information is deleted, and the valid authentication information is forwarded in a security mode. Therefore, after receiving the authentication information, a next node may determine without further verification that the authentication information is received not for the first time. This reduces resources of the constrained node and shortens a time for the authentication information to travel from the client to the resource server. The valid authentication information with the forward token deleted still contains all subsequent information that is of the authentication information and that is from the source address to the destination address.

In the forwarding method for authentication information in the Internet of Things according to this embodiment of the present application, after receiving authentication information for the first time, a constrained node determines whether the authentication information is valid authentication information, and if the authentication information is valid authentication information, the constrained node verifies the valid authentication information, and forwards the valid authentication information after the verification succeeds. This prevents a large amount of malicious authentication information from occupying bandwidth and consuming electric power of the constrained node that forwards the authentication information. In another case, when the authentication information is received not for the first time, the constrained node directly forwards the authentication information, so as to avoid wasting of system resources and improve performance of the Internet of Things.

Figure 2:
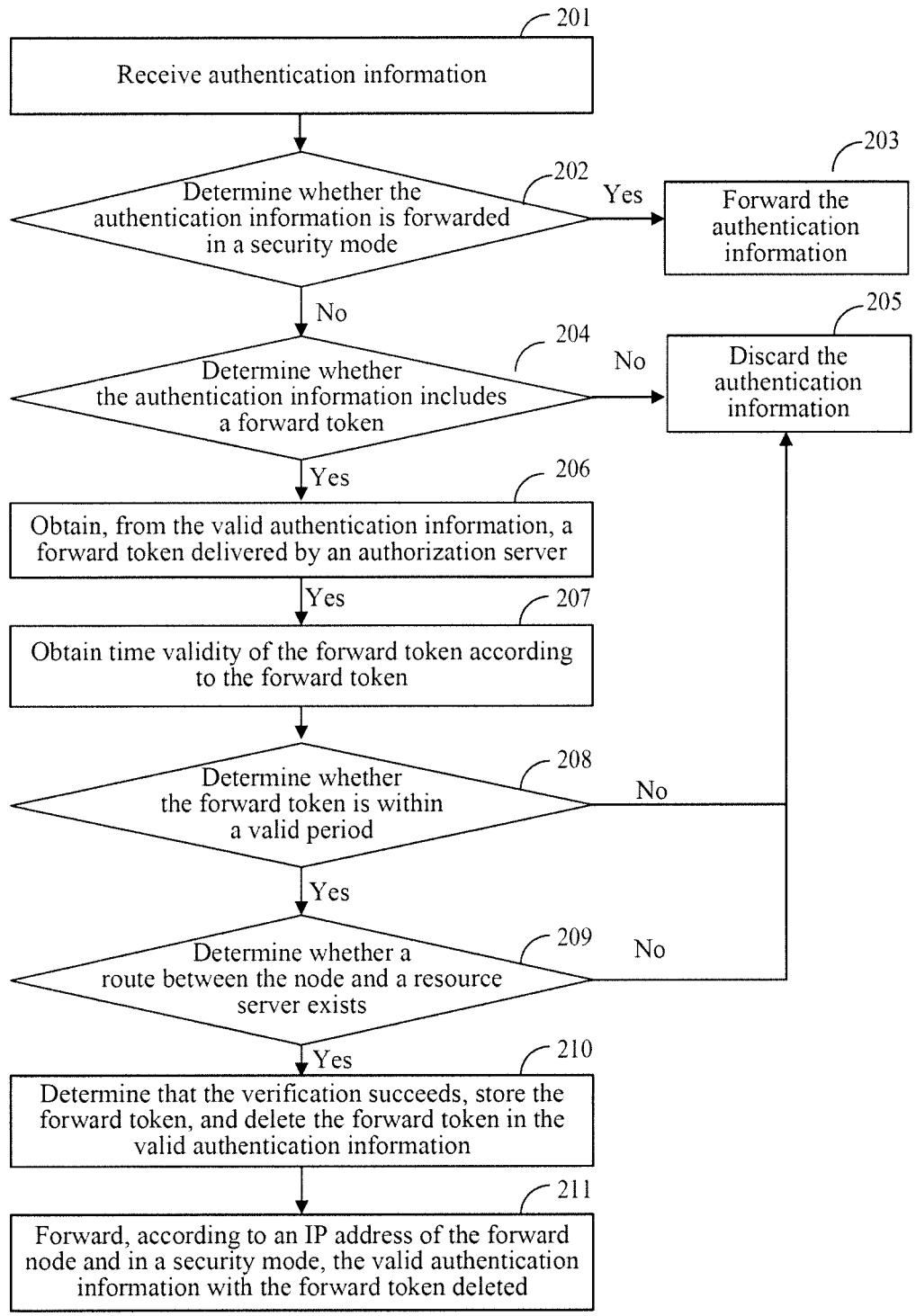
FIG. 2 shows a flowchart of a forwarding method for authentication information in the Internet of Things according to an embodiment of the present application.

FIG. 2 shows a flowchart of a forwarding method for authentication information in the Internet of Things according to an embodiment of the present application. The method is applied to a constrained node. As shown in FIG. 2, the method includes the following steps.

S201: Receive authentication information.

S202: Determine whether the authentication information is forwarded in a security mode, where if the authentication information is forwarded in a security mode, that is, the authentication information is received not for the first time, S203 continues; or if the authentication information is forwarded not in a security mode, that is, the authentication information is received for the first time, S204 continues.

S203: Forward the authentication information.

S204: Determine whether the authentication information includes a forward token; and if the authentication information does not include a forward token, that is, the authentication information is not valid authentication information, perform S205, or if the authentication information includes a forward token, that is, the authentication information is valid authentication information, perform S206.

S205: Discard the authentication information.

S206: Obtain, from the valid authentication information, the forward token delivered by an authorization server.

S207: Obtain time validity of the forward token according to the forward token.

S208: Determine whether the forward token is within a valid period; and if the forward token is not within the valid period, perform S205, or if the forward token is within the valid period, perform S209.

S209: Determine whether a route between the node and a resource server exists; and if the route does not exist, perform S205, or if the route exists, perform S210.

S210: Determine that the verification succeeds, store the forward token, and delete the forward token in the valid authentication information.

S211: Forward, according to the IP address of the forwarding node and in a security mode, the valid authentication information with the forward token deleted.

In the forwarding method for authentication information in the Internet of Things according to this embodiment of the present application, after receiving authentication information for the first time, a constrained node verifies the authentication information, and forwards the authentication information after the verification succeeds. This prevents a large amount of malicious authentication information from occupying bandwidth and consuming electric power of the constrained node that forwards the authentication information. In another case, when the authentication information is received not for the first time, the constrained node directly forwards the authentication information, so as to avoid wasting of system resources and improve performance of the Internet of Things.

Figure 3:
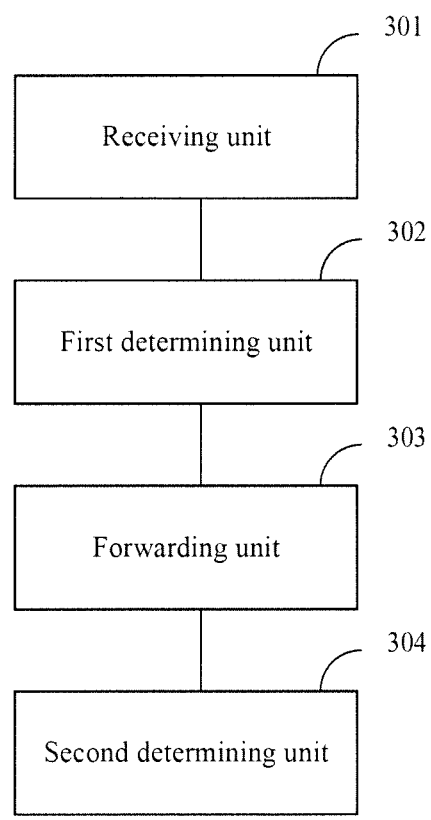
FIG. 3 shows a schematic diagram of a forwarding apparatus for authentication information in the Internet of Things according to an embodiment of the present application.

Corresponding to the foregoing methods, an embodiment of the present application further provides a forwarding apparatus for authentication information in the Internet of Things. FIG. 3 shows a schematic diagram of a structure of a forwarding apparatus for authentication information in the Internet of Things according to an embodiment of the present application. As shown in FIG. 3, the apparatus includes:

a receiving unit 301, configured to receive authentication information;

a first determining unit 302, configured to determine whether the authentication information is received for the first time;

a forwarding unit 303, configured to: if the authentication information is received not for the first time, forward the authentication information; and a second determining unit 304, configured to: if the authentication information is received for the first time, determine whether the authentication information is valid authentication information, and if the authentication information is not valid authentication information, discard the authentication information, or if the authentication information is valid authentication information, verify the valid authentication information, and forward the valid authentication information after the verification succeeds.

Optionally, the first determining unit 302 is configured to:

if the authentication information is forwarded in a security mode, determine that the authentication information is received not for the first time; or if the authentication information is forwarded not in a security mode, determine that the authentication information is received for the first time.

Optionally, the second determining unit 304 is configured to:

if the authentication information includes a forward token, determine that the authentication information is valid authentication information; or if the authentication information does not include a forward token, determine that the authentication information is not valid authentication information.

Optionally, the second determining unit 304 includes a verification subunit, and the verification subunit is configured to:

obtain, from the valid authentication information, a forward token delivered by an authorization server;

determine whether the forward token is a legitimate token; and if the forward token is a legitimate token, determine that the verification succeeds; or if the forward token is not a legitimate token, determine that the verification fails.

Optionally, the verification subunit is further configured to:

obtain time validity of the forward token according to the forward token;

determine whether the forward token is within a valid period;

if the forward token is within the valid period, determine whether a route between the node and a resource server exists; and if the route exists, determine that the forward token is a legitimate token.

Optionally, the second determining unit 304 further includes a valid authentication information forwarding subunit, and the valid authentication information forwarding subunit is configured to:

obtain a forwarding node in each existing route, where the forwarding node is a node that receives the valid authentication information forwarded by the node; and obtain an IP address of each forwarding node, and forward the valid authentication information according to the IP address of the forwarding node.

Optionally, the valid authentication information forwarding subunit is further configured to:

delete the forward token in the valid authentication information; and forward, according to the IP address of the forwarding node and in a security mode, the valid authentication information with the forward token deleted.

With the forwarding apparatus for authentication information in the Internet of Things according to this embodiment of the present application, a large amount of malicious authentication information is prevented from occupying bandwidth and consuming electric power of a constrained node that forwards authentication information, and performance of the Internet of Things is improved.

Figure 4:
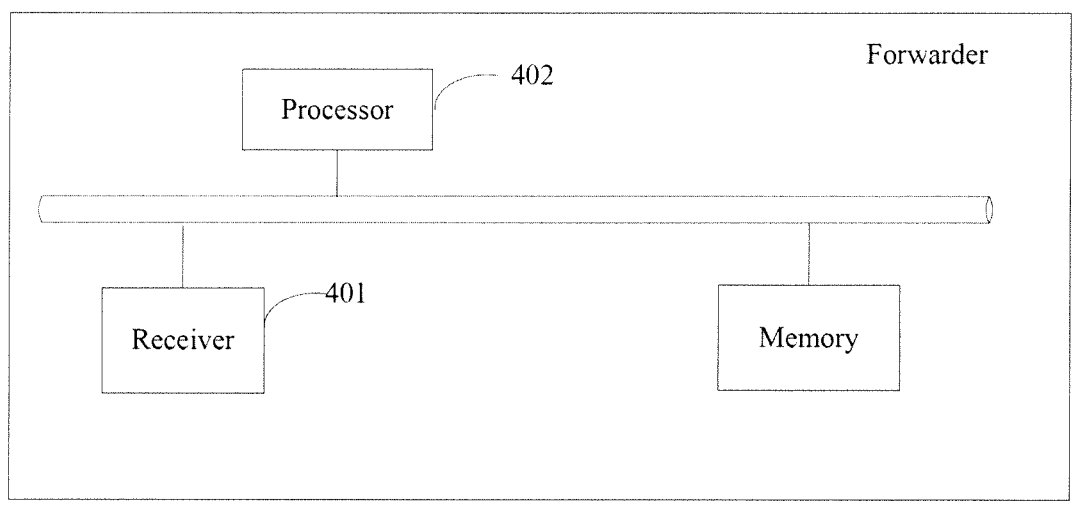
FIG. 4 shows a schematic diagram of a forwarder for authentication information in the Internet of Things according to an embodiment of the present application.

FIG. 4 shows a schematic diagram of a forwarder for authentication information in the Internet of Things according to an embodiment of the present application. As shown in FIG. 4, the forwarder includes:

a receiver 401, configured to receive authentication information; and a processor 402, configured to determine whether the authentication information is received for the first time, where the processor 402 is further configured to: if the authentication information is received not for the first time, forward the authentication information; and the processor 402 is further configured to: if the authentication information is received for the first time, determine whether the authentication information is valid authentication information, and if the authentication information is not valid authentication information, discard the authentication information, or if the authentication information is valid authentication information, verify the valid authentication information, and forward the valid authentication information after the verification succeeds.

Optionally, the processor 402 is configured to:

if the authentication information is forwarded in a security mode, determine that the authentication information is received not for the first time; or if the authentication information is forwarded not in a security mode, determine that the authentication information is received for the first time.

Optionally, the processor 402 is configured to:

if the authentication information includes a forward token, determine that the authentication information is valid authentication information; or if the authentication information does not include a forward token, determine that the authentication information is not valid authentication information.

Optionally, the processor 402 is configured to:

obtain, from the valid authentication information, a forward token delivered by an authorization server;

determine whether the forward token is a legitimate token; and if the forward token is a legitimate token, determine that the verification succeeds; or if the forward token is not a legitimate token, determine that the verification fails.

Optionally, the processor 402 is configured to:

obtain time validity of the forward token according to the forward token;

determine whether the forward token is within a valid period;

if the forward token is within the valid period, determine whether a route between the node and a resource server exists; and if the route exists, determine that the forward token is a legitimate token.

Optionally, the processor 402 is configured to:

obtain a forwarding node in each existing route, where the forwarding node is a node that receives the valid authentication information forwarded by the node; and obtain an IP address of each forwarding node, and forward the valid authentication information according to the IP address of the forwarding node.

Optionally, the processor 402 is further configured to:

delete the forward token in the valid authentication information; and forward, according to the IP address of the forwarding node and in a security mode, the valid authentication information with the forward token deleted.

The forwarder for authentication information in the Internet of Things according to this embodiment of the present application, after authentication information is received for the first time, determines whether the authentication information is valid authentication information, verifies the valid authentication information, and forwards the authentication information after the verification succeeds. This prevents not-valid authentication information from occupying bandwidth and consuming electric power of a constrained node, and improves performance of the Internet of Things.

The embodiments of the present application disclose a forwarding method, a forwarding apparatus, and a forwarder for authentication information in the Internet of Things. In the embodiments of the present application, after receiving authentication information for the first time, a constrained node determines whether the authentication information is valid authentication information, verifies the valid authentication information, and forwards the authentication information after the verification succeeds. This prevents invalid authentication information, for example, a large amount of malicious authentication information, from occupying bandwidth and consuming electric power of the constrained node that forwards the authentication information. In another case, when the authentication information is received not for the first time, the constrained node directly forwards the authentication information, so as to avoid wasting of system resources and improve performance of the Internet of Things.

It may be clearly understood by a person skilled in the art that the technology in the embodiments of the present application may be implemented by software plus necessary general-purpose hardware. The general-purpose hardware includes a general-purpose integrated circuit, a general-purpose CPU, a general-purpose memory, a general-purpose component, and the like. Certainly, the technology may be implemented as well by application-specific hardware, including an application-specific integrated circuit, an application-specific CPU, an application-specific memory, an application-specific component, and the like. However, in many cases, the former one is more preferred. Based on such an understanding, the technical solutions of the present application essentially or the part contributing to the prior art may be implemented in a form of a software product. The software product is stored in a storage medium, such as a read-only memory (ROM), a random access memory (RAM), a hard disk, or an optical disc, and includes a quantity of instructions for instructing a computer device (which may be a personal computer, a server, or a network device) to perform the methods described in the embodiments or some parts of the embodiments of the present application.

The embodiments in this specification are all described in a progressive manner. For same or similar parts in the embodiments, mutual reference may be made. Each embodiment focuses on what is different from other embodiments. Especially, a system embodiment is essentially similar to a method embodiment, and therefore is described briefly. For related information, reference may be made to descriptions about this in the method embodiment.

The foregoing descriptions are implementation manners of the present application, and are not intended to limit the protection scope of the present application. Any modification, equivalent replacement, and improvement made without departing from the spirit and principle of the present application shall fall within the protection scope of the present application.

What is claimed is:

1. A forwarding method for authentication information in an Internet of Things, wherein the method comprises:
   receiving, by a constrained node, authentication information from an Internet of Things client, wherein the constrained node is a network device with reduced computing, storage, power supply, and network communication bandwidth capabilities relative to neighboring network nodes;
   determining, by the constrained node, that the authentication information is received for a first time;
   verifying, by the constrained node, the authentication information when the authentication information is received for the first time, wherein verifying the authentication information comprises:
      obtaining, from the authentication information, a forward token delivered by an authorization server;
      obtaining time validity of the forward token from the forward token;
      determining that the forward token is a legitimate token when the forward token is within a valid period and a route between the constrained node and a resource server exists; and
      determining that the verification succeeds when the forward token is the legitimate token;
   forwarding, by the constrained node, the authentication information after the verification succeeds when the authentication information is received for the first time and when the authentication information is valid authentication information;
   discarding, by the constrained node, the authentication information when the authentication information is not valid;
   receiving, by the constrained node, the authentication information for a second time; and
   directly forwarding, by the constrained node, the authentication information without verification when the authentication information is received for the second time.

2. The method of claim 1, wherein determining that the authentication information is received for the first time comprises determining that the authentication information is received for the first time when the authentication information is not forwarded in a security mode.

3. The method of claim 1, wherein the method further comprises determining the authentication information is not valid authentication information when the authentication information is not forwarded in a security mode.

4. The method of claim 1, wherein when the verification succeeds, the method further comprises:
   determining a forwarding node in each existing route, wherein the forwarding node is a node that receives the valid authentication information forwarded by the constrained node;
   obtaining an Internet Protocol (IP) address of each forwarding node; and
   forwarding the authentication information according to the IP address of the forwarding node.

5. The method of claim 4, wherein forwarding the authentication information according to the IP address of the forwarding node comprises:
   deleting the forward token in the authentication information; and
   forwarding, according to the IP address of the forwarding node and in a security mode, the authentication information with the forward token deleted.

6. A forwarder for authentication information in an Internet of Things, wherein the forwarder is a constrained node and comprises:
   a receiver configured to:
      receive authentication information for a first time from an Internet of Things client; and
      receive the authentication information for a second time;
   and a processor coupled to the receiver and configured to:
      determine that the authentication information is received for the first time;
      verify the authentication information when the authentication information is received for the first time, wherein to verify the authentication information, the processor is to obtain, from the authentication information, a forward token delivered by an authorization server; obtain time validity of the forward token from the forward token; determine that the forward token is a legitimate token when the forward token is within a valid period and a route between the constrained node and a resource server exists; and determine that the verification succeeds when the forward token is the legitimate token;
      forward the authentication information after the verification succeeds when the authentication information is received for the first time and when the authentication information is valid authentication information;
      discard the authentication information when the authentication information is not valid; and
      directly forward the authentication information without verification when the authentication information is received for the second time, wherein the constrained node is a network device with reduced computing, storage, power supply, and network communication bandwidth capabilities relative to neighboring network nodes.

7. The forwarder of claim 6, wherein the processor determines that the authentication information is received for the first time when the authentication information is not forwarded in a security mode.

8. The forwarder of claim 6, wherein the processor is further configured to determine that the authentication information is not valid authentication information when the authentication information is not forwarded in a security mode.

9. The forwarder of claim 6, wherein the processor is further configured to:

determine a forwarding node in each existing route, wherein the forwarding node is a node that receives the authentication information forwarded by the constrained node;

obtain an Internet Protocol (IP) address of each forwarding node; and forward the authentication information according to the IP address of the forwarding node.

10. The forwarder of claim 9, wherein the processor is further configured to delete the forward token in the authentication information, wherein the authentication information is forwarded with the forward token deleted.

11. A non-transitory computer-readable storage medium comprising instructions which, when executed by a constrained node, cause the constrained node to:

receive authentication information from an Internet of Things client, wherein the constrained node is a network device with reduced computing, storage, power supply, and network communication bandwidth capabilities relative to neighboring network nodes;

determine the authentication information is received for a first time;

verify the authentication information when the authentication information is received for the first time, wherein to verify the authentication information, the processor is to obtain, from the authentication information, a forward token delivered by an authorization server; obtain time validity of the forward token from the forward token; determine that the forward token is a legitimate token when the forward token is within a valid period and a route between the constrained node and a resource server exists; and determine that the verification succeeds when the forward token is the legitimate token;

forward the authentication information after the verification succeeds when the authentication information is received for the first time and when the authentication information is valid authentication information;

discard the authentication information when the authentication information is not valid;

receive the authentication information for a second time; and directly forward the authentication information without verification when the authentication information is received for the second time.

12. The non-transitory computer-readable storage medium of claim 11, wherein determining the authentication information is received for the first time comprises determining that the authentication information is received for the first time when the authentication information is not forwarded in a security mode.

13. The non-transitory computer-readable storage medium of claim 11, wherein the instructions further cause the constrained node to determine the authentication information is not valid authentication information when the authentication information is not forwarded in a security mode.

14. The non-transitory computer-readable storage medium of claim 11, wherein when the verification succeeds, the instructions further cause the constrained node to:

determine a forwarding node in each existing route, wherein the forwarding node is a node that receives the authentication information forwarded by the constrained node;

obtain an Internet Protocol (IP) address of each forwarding node; and forward the authentication information according to the IP address of the forwarding node.

* * * * *